ced Mar. 17, 1970

3,501,300
PHOTOGRAPHIC MATERIALS

Fumihiko Nishio, Nobuo Yamamoto, Kikuo Yamagishi, and Masazumi Aono, Ashigrara-Kamigun, Kanagawa, Japan, assignors to Fuji Shashin Film Kabushiki Kaisha, Kanagawa, Japan
No Drawing. Filed Nov. 2, 1965, Ser. No. 506,131
Claims priority, application Japan, Nov. 9, 1964, 39/63,102
Int. Cl. G03c 1/80, 1/84
U.S. Cl. 96—87       3 Claims

ABSTRACT OF THE DISCLOSURE

A photographic material which has on a cellulose ester support, at least one silver halide emulsion layer, and at least one subbing layer containing 1,3-dihydroxybenzene between the support and the emulsion layers.

This invention relates to a photographic material and particularly to a photographic material having an improved subbing layer for improving the adhesive property between a support and a photographic emulsion layer in the case of using a cellulose ester as the support. It has hitherto been proposed to first apply a subbing layer on a cellulose ester film support, for example, a cellulose triacetate film support, in order to improve the adhesive property of the photographic emulsion thereto. A resin used ordinarily for such subbing layer is a natural material, such as, gelatin, glue, its modified material, or a hydrophilic synthetic resin having at least one hydrophilic group.

As is well known in the art, subbing is carried out by applying previously a subbing solution of gelatin dispersed in water, an organic acid or an organic solvent on a cellulose triacetate film support, or applying a dilute cellulose nitrate dope and a subbing solution containing gelatin on a cellulose triacetate film support. Thereafter, a light sensitive emulsion layer is applied on the subbing layer.

The photographic material is generally treated with aqueous solutions varying in the pH and temperature in developing, stopping, fixing and water-washing, so the photographic material produced by the foregoing method has encountered such disadvantages that the emulsion layer tends to be partially stripped from the support during the processings and the adhesive strength during drying and/or wetting is lowered. In examining the stripped surfaces by means of a microscope or by the degree of dyeability, it is found that the adhesion between a support and a gelatin subbing layer is relatively strong, that is, stripping does not occur therebetween, but occurs between the emulsion layer and gelatin subbing intermediate layer.

Various methods have been proposed to improve the adhesive properties, for example, adding a hardener such as formaldehyde to a subbing layer containing gelatin, but the adhesive strength of the photographic material produced by these methods is not satisfactory, in particular, during the wetting, although the adhesive strength is practically improved to some extent.

We have found as a result of numerous studies that the foregoing difficult problem can be readily solved by adding 1,3-dihydroxybenzene to subbing layers, that is to say, the adhesion can be remarkably strengthened by the addition of this compound even when a strong adhesion between an emulsion layer and subbing layer cannot be obtained by the prior method. In particular, the adhesive strength of the light sensitive material produced by the method of our invention during wetting is remarkably increased and an emulsion layer is adhered to a subbing layer so sufficiently as to result in the resistance to any usual processing.

The important feature of this additive lies in that the addition thereof to a subbing layer does not give bad influences upon the photographic properties, such as, sensitivity, gamma, and fog.

In this invention, 1,3-dihydroxybenzene to be added to a subbing layer is employed in a proportion of 0.1–30% by weight, preferably 2–20% by weight to a subbing resin such as gelatin contained in the subbing layer. It may be added with or without other additive such as a hardener for hardening the subbing layer. If it is used as an aqueous or an organic solvent solution of alcohol or ketone during the addition, it can be added into solutions containing almost any resins.

In carrying out the present invention, for example, in the use of cellulose triacetate film as a support, a subbing solution containing 1,3-dihydroxybenzene is applied on the surface thereof in a conventional manner and then a photographic emulsion layer is applied thereon directly. The adhesive property between the film support and the photographic emulsion layer is not sufficient just after the application, but becomes strong after allowing to stand for ten and more days, which is sufficient to result in practical photographic films. Moreover, when a gelatin layer is further applied on the subbing layer and adequately dried at a temperature above 60° C., the adhesion is more strengthened. In this case, 1,3-dihydroxybenzene may be added to the gelatin layer also. When it is added to the gelatin layer, the addition thereof to the lower layer may be eliminated or the lower layer itself may be eliminated to give a similar strengthening of the adhesion.

The present invention is further illustrated by the following procedures and examples, but is not limited thereby.

The adhesive property of a photographic emulsion to a support is measured or estimated by the ordinary test as described hereinafter.

(1) ADHESION TEST DURING DRYING

Fine lines are drawn to be a mesh on a film on which a photographic emulsion is applied, followed by drying, and the film after the usual photographic processing and drying, the distance between the lines being approximately 3 mm., an adhesive pressure sensitive tape is pasted thereon and rapidly stripped. The adhesive strength in this test is defined as follows: when the non-stripped part is above 90%, the adhesive strength is A, above 80% the adhesive strength B and below 79% the adhesive strength C.

(2) ADHESION TEST DURING WET PROCESSINGS

When a fine line is drawn on and through the emulsion surface of a film during processing in the photographic processing step such as developing, fixing and water-washing, and a force in contact with the line is added in the direction vertical to the line, the adhesive strength in the case where the emulsion layer is not stripped more than the initial cut is defined as A, the adhesive strength in the case where the emulsion layer is stripped within a range of 1–10 mm. is defined as B and above 11 mm. C.

In the relative measure of the estimation in the foregoing tests (1) and (2), A means the most preferable one and C means the most unfavorable relative estimation for the adhesive property to be desired.

Example 1

An emulsion of a polymerization product obtained by the copolymerization of 12% by weight of N-butylacrylamide, 38% by weight of ethyl methacrylate and 50% by weight of butyl acrylate, and thus formed precipitate was dried and dissolved in a mixed solvent of 40% acetone, 50% methanol and 10% methylene chloride to prepare a 2% solution, which was coated on a cellulose triacetate support and dried at 60° C. Then, a gelatin dispersion consisting of 1% by weight of gelatin, 2% by weight of water, 2% by weight of acetic acid, 80% by weight of methanol, 10% by weight of acetone and 2% by weight of a 5% methanol solution of 1,3-dihydroxybenzene was applied thereon and dried at 90° C. On the resulting surface were applied a gelatin layer and a negative-type silver bromo iodide emulsion layer, followed by drying. For comparison, another photographic film was prepared by the similar procedure as described above except the addition of 1,3-dihydroxybenzene.

The adhesive properties of those photographic films were determined in accordance with the relative measure of the foregoing tests, the results of which are as follows:

| 1,3-dihydroxybenzene | Adhesiveness at drying | Adhesiveness at wetting |
|---|---|---|
| Added | A | A |
| Not added control | B | C |

It is evident from the table that in this invention, the adhesive strength is remarkably improved.

Example 2

A gelatin dispersion consisting of 1% by weight of gelatin, 0.5% by weight of acetic acid, 30% by weight of methanol, 60% by weight of acetone, 10% by weight of methylene chloride and 3% by weight of a 5% methanol solution of 1,3-dihydroxybenzene was coated on a cellulose triacetate support and dried, and a gelatin-silver bromo iodide X-ray emulsion was applied on the surface and dried. The adhesive property between the emulsion layer and the support of the resulting photographic film is shown in the following table, from which it is evident that the adhesive strength by this invention is remarkably increased as compared with the standard for comparison.

| 1,3-dihydroxybenzene | Adhesiveness at drying | Adhesiveness at wetting |
|---|---|---|
| Added | A | A |
| Not added control | B | B |

Example 3

A gelatin dispersion consisting of 1% by weight of gelatin, 2% by weight of water, 1% by weight of salicylic acid, 80% by weight of methanol, 20% by weight of acetone and 2% by weight of a 20% aqueous solution of formaldehyde and 5% methanol solution of 1,3-dihydroxybenzene was applied on a cellulose triacetate support and dried and a positive-type gelatin-silver bromo-chloride emulsion was applied on the surface and dried. Then, the photographic film having a large adhesive strength at wetting, as compared with the standard for comparison to which 1,3-dihydroxybenzene was not added, was obtained.

| 1,3-dihydroxybenzene | Adhesiveness at drying | Adhesiveness at wetting |
|---|---|---|
| Added | A | A |
| Not added control | A | B |

What is claimed is:

1. A photographic material comprising a cellulose ester support, at least one silver halide emulsion layer, and at least one subbing layer between the support and the emulsion layer, and next to said support, said subbing layer consisting of gelatin and from 0.1 to 30% by weight, based on the amount of gelatin, of 1,3-dihydroxybenzene.

2. The photographic material as claimed in claim 1 wherein the amount of said 1,3-dihydroxybenzene is 2 to 20% by weight based on the amount of the gelatin.

3. The photographic material as claimed in claim 1 wherein said subbing layer contains a hardener.

References Cited

UNITED STATES PATENTS

| 2,258,997 | 10/1941 | Nadeau | 96—87 XR |
| 2,269,220 | 1/1942 | Nadeau | 96—87 XR |
| 2,852,378 | 9/1958 | Nadeau | 96—87 |
| 2,698,235 | 12/1954 | Swindelle | 96—87 XR |
| 3,201,249 | 8/1965 | Pierce et al. | 96—84 |
| 3,143,421 | 8/1964 | Nadeau et al. | 96—87 |

GEORGE F. LESMES, Primary Examiner

J. P. BRAMMER, Assistant Examiner

U.S. Cl. X.R.

96—84